US010841063B2

(12) United States Patent
Nammi et al.

(10) Patent No.: US 10,841,063 B2
(45) Date of Patent: Nov. 17, 2020

(54) INDICATING A NUMBER OF CODEWORDS IN 5G WIRELESS COMMUNICATION SYSTEMS

(71) Applicant: AT&T INTELLECTUAL PROPERTY I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 258 days.

(21) Appl. No.: 15/947,226

(22) Filed: Apr. 6, 2018

(65) Prior Publication Data

US 2019/0312706 A1  Oct. 10, 2019

(51) Int. Cl.
  *H04L 5/00* (2006.01)
  *H04L 1/00* (2006.01)
  *H04W 72/04* (2009.01)

(52) U.S. Cl.
  CPC .......... *H04L 5/0053* (2013.01); *H04L 1/0003* (2013.01); *H04L 1/0009* (2013.01); *H04L 1/0013* (2013.01); *H04L 1/0025* (2013.01); *H04L 1/0075* (2013.01); *H04W 72/042* (2013.01); *H04W 72/0466* (2013.01)

(58) Field of Classification Search
  CPC combination set(s) only.
  See application file for complete search history.

(56) References Cited

U.S. PATENT DOCUMENTS

| | | |
|---|---|---|
| 7,835,337 B2 | 11/2010 | Kim et al. |
| 8,687,527 B2 | 4/2014 | Jiang et al. |
| 8,737,369 B2 | 5/2014 | Yeon et al. |
| 8,856,606 B2 | 10/2014 | Lee et al. |
| 9,781,703 B2 | 10/2017 | Aiba et al. |
| 9,787,451 B2 | 10/2017 | Seo et al. |
| 9,788,312 B2 | 10/2017 | Ko et al. |
| 9,906,397 B2 | 2/2018 | Park et al. |

(Continued)

OTHER PUBLICATIONS

International Search Report and Written Opinion received for PCT Application Serial No. PCT/US2019/025453 dated Jul. 9, 2019, 19 pages.

(Continued)

*Primary Examiner* — Mounir Moutaouakil
(74) *Attorney, Agent, or Firm* — Amin, Turocy & Watson, LLP

(57) ABSTRACT

Various embodiments disclosed herein provide for indicating a number of codeword symbols in a data traffic transmission. Depending on the number of layers of a data traffic transmission, the transmission can either comprise one codeword symbol or two codeword symbols. If there are two codeword symbols included in a data traffic transmission, the transmitter can indicate the modulation code scheme and other information for each codeword symbol in the first codeword symbol and second codeword symbol locations in the downlink control information data structure. If there is only one codeword symbol, however, the transmitter can provide a modulation code scheme and redundancy version that would not be self-decodable in the second codeword symbol setting location, indicating to the receiver that there is only one codeword symbol in the data traffic transmission.

20 Claims, 10 Drawing Sheets

(56) References Cited

U.S. PATENT DOCUMENTS

| | | | |
|---|---|---|---|
| 9,923,676 B2 | 3/2018 | Chung et al. | |
| 2007/0255994 A1* | 11/2007 | Michel | H04L 1/0045 |
| | | | 714/751 |
| 2008/0298387 A1* | 12/2008 | Lohr | H04L 1/1671 |
| | | | 370/467 |
| 2010/0098006 A1* | 4/2010 | Golitschek Edler Von Elbwart | H04L 1/1854 |
| | | | 370/329 |
| 2011/0014907 A1* | 1/2011 | Ringstrom | H04L 1/1812 |
| | | | 455/422.1 |
| 2011/0305213 A1* | 12/2011 | Lohr | H04L 1/1887 |
| | | | 370/329 |
| 2012/0300728 A1* | 11/2012 | Lee, II | H04L 5/0053 |
| | | | 370/329 |
| 2014/0071909 A1 | 3/2014 | Frenne et al. | |
| 2016/0073339 A1 | 3/2016 | Tabet et al. | |
| 2017/0171850 A1 | 6/2017 | Ang et al. | |
| 2017/0272220 A1 | 9/2017 | Chen et al. | |
| 2018/0102877 A1 | 4/2018 | Jiang et al. | |

OTHER PUBLICATIONS

AT&T, "Remaining Issues for MIMO Codeword Mapping", URL: http://www.3gpp.org/ftp/tsg%5Fran/WG1%5FRL1/TSGR1%5F92b/Docs/, 3GPP TSG RAN WG1 Meeting #92bis, R1-1804654, Apr. 16-20, 2018, 3 pages.

Motorola, "Remaining Details on DCI Format 2", 3GPP TSG RAN WG1#53bis, R1-082335, Jun. 30-Jul. 4, 2008, 2 pages.

Panasonic, "Single codeword indication on DCI format 2", 3GPP TSG-RAN WG1 Meeting #53b, R1-082400, Jun. 30-Jul. 4, 2008, 4 pages.

* cited by examiner

500 →

| MCS Index $I_{MCS}$ | Modulation Order $Q_m$ | Target code Rate x [1024] $R$ | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

| MCS Index $I_{MCS}$ | Modulation Order $Q_m$ | Target code Rate x [1024] R | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

FIG. 6

INDICATING A NUMBER OF CODEWORDS IN 5G WIRELESS COMMUNICATION SYSTEMS

TECHNICAL FIELD

The present application relates generally to the field of mobile communication and, more specifically, to indicating a number of codewords in a data traffic transmission in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 illustrates an example modulation scheme table in accordance with various aspects and embodiments of the subject disclosure.

FIG. 6 illustrates an example modulation scheme table in accordance with various aspects and embodiments of the subject disclosure.

DETAILED DESCRIPTION

Figure 1:
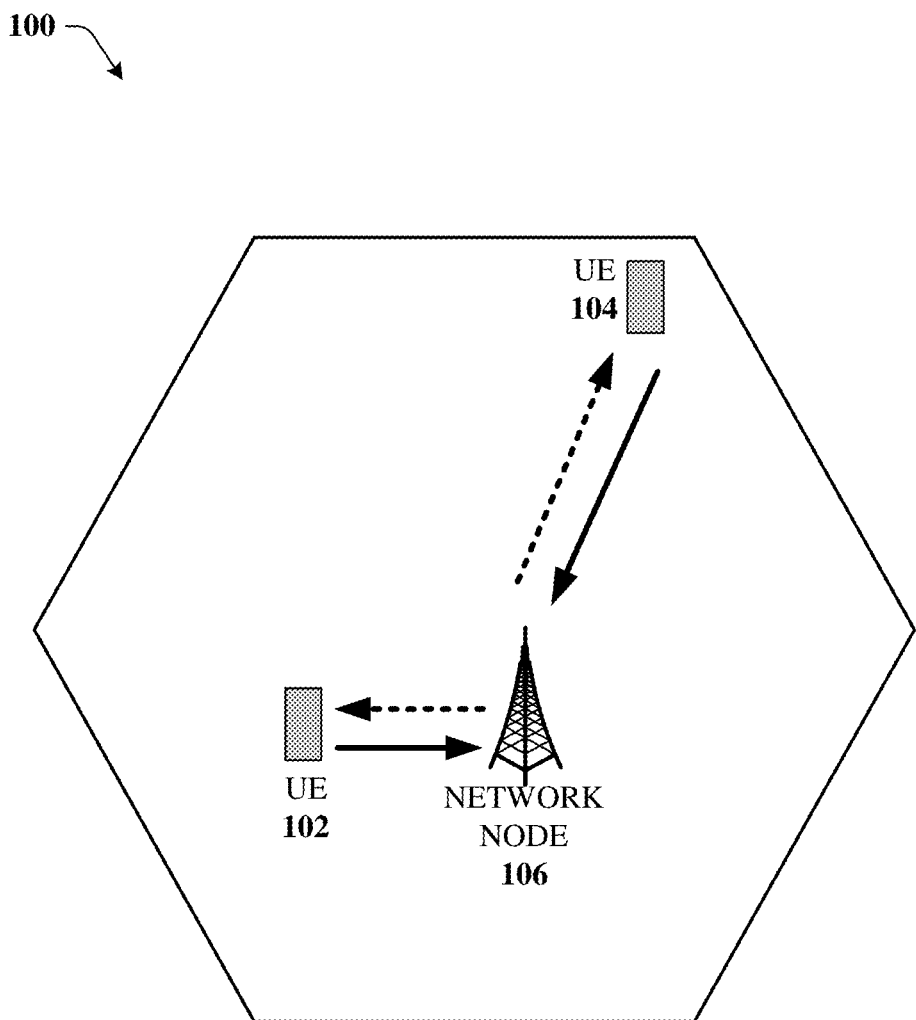
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for indicating a number of codeword symbols in a data traffic transmission. Depending on the number of layers of a data traffic transmission, the transmission can either comprise one codeword symbol or two codeword symbols. If there are two codeword symbols included in a data traffic transmission, the transmitter can indicate the modulation code scheme and other information for each codeword symbol in the first codeword symbol and second codeword symbol locations in the downlink control information data structure. If there is only one codeword symbol however, the standard does not provide a location to explicitly indicate to the receiver that there is only one codeword symbol. Instead, the transmitter can provide a modulation code scheme and redundancy version that would not be self-decodable in the second codeword symbol setting location, indicating to the receiver that there is only one codeword symbol in the data traffic transmission.

While reference is generally made throughout the disclosure to a uplink data transmissions, in other embodiments, the principles disclosed herein can apply to downlink transmissions as well.

In various embodiments, a transmitter device can comprise a processor and a memory that stores executable instructions that, when executed by the processor facilitate performance of operations. The operations can comprise determining that a data transmission to a receiver device comprises a single codeword symbol. The operations can also comprise selecting a modulation scheme for the data transmission. The operations can also comprise facilitating a downlink control channel transmission via a downlink control channel, the downlink control channel transmission comprising first selection information representative of a first selection of the modulation scheme, wherein the downlink control channel transmission comprises a first group of settings associated with a first codeword symbol and a second group of settings associated with a second codeword symbol, wherein the first group of settings comprises the first selection information, and wherein the second group of settings comprises second selection information representative of a second selection of settings that indicate a codeword symbol that is not self-decodable.

In another embodiment, method comprises determining, by a network device comprising a processor, that a multi-antenna data transmission to a receiver device comprises one to four layers. The method can also comprise selecting, by the network device, a first modulation scheme for the multi-antenna data transmission. The method can also comprise transmitting, by the network device, a downlink control channel transmission that comprises a first group of settings for a first codeword symbol, and a second group of settings for a second codeword symbol, wherein the first group of settings are associated with the first modulation scheme, and wherein the second group of settings indicate a non-self-decodable codeword symbol.

In another embodiment, a receiver device can comprise a processor and a memory that stores executable instructions that, when executed by the processor facilitate performance of operations. The operations can comprise receiving a downlink control channel transmission associated with a data transmission, comprising a first group of downlink control settings for a first codeword symbol and a second group of downlink control settings for a second codeword symbol. The operations can also comprise determining that the data transmission comprises a single codeword symbol in response to determining that the second group of downlink control settings are associated with a codeword symbol that is unable to be self decoded. The operations can also comprise decoding the data transmission as a single codeword transmission based on the first group of downlink control settings.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 can transmit MIMO data traffic transmissions to UE 102 and 104. Depending on the quality of the communications link between the UEs 102 and 104 and the network node 106, the data traffic transmission can have as many as 8 layers or streams of data being transmitted at the same time, where up to codeword symbols are used to convey the up to 8 layers. For layers 1-4, one codeword symbol is used, whereas for transmissions of layers 5-8, two codeword symbols can be used. The network node can 106 can provide downlink control information including modulation code scheme, redundancy version, and whether or not the transmission is new data or a retransmission (new data indicator).

Figure 2:
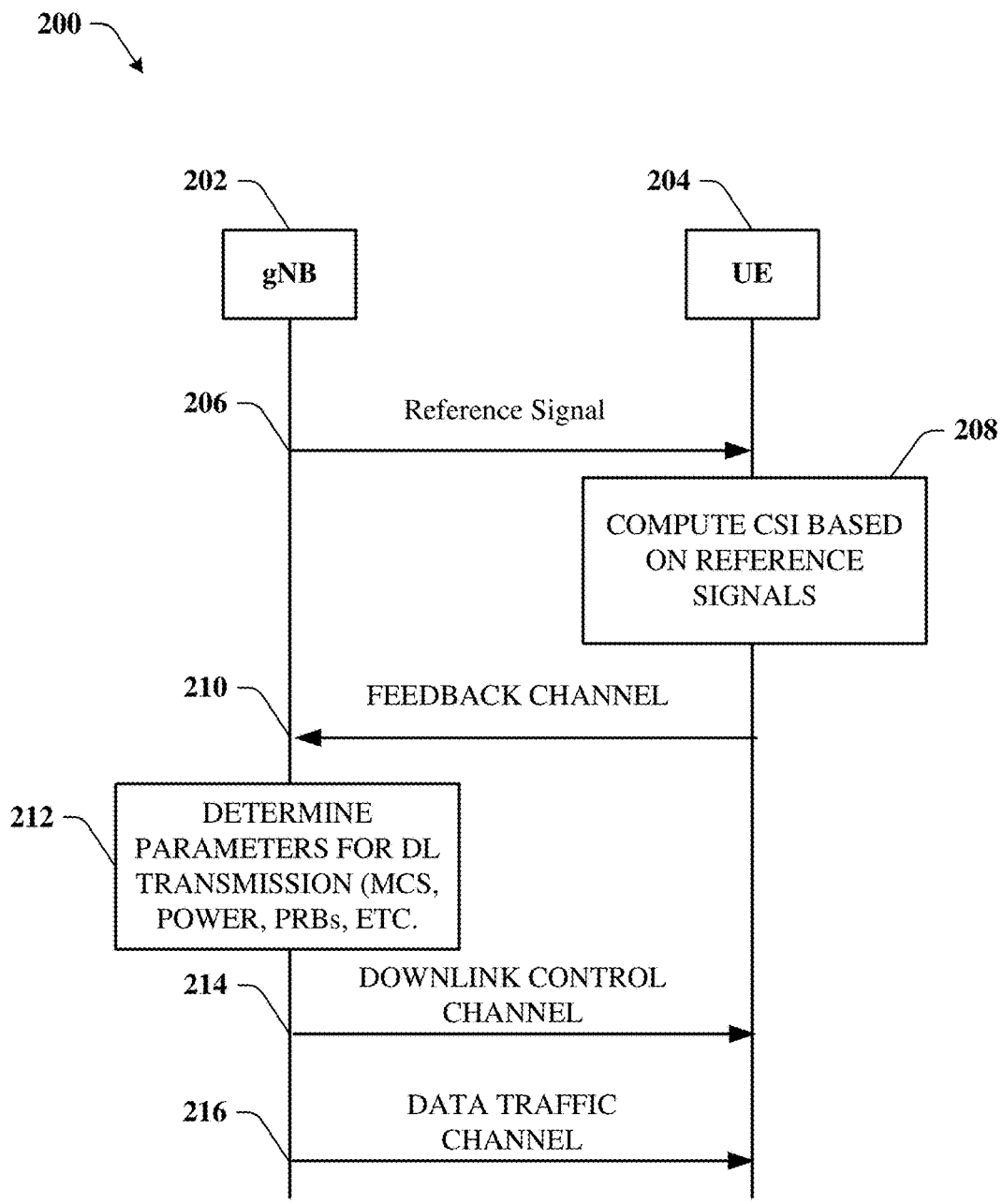
FIG. 2 illustrates an example block diagram showing a message sequence chart in accordance with various aspects and embodiments of the subject disclosure.

In NR or 5G, for data transmission, the transport block is encoded using LDPC code. In the first step of the physical-layer processing, a 24-bit CRC is calculated for and appended to each transport block. The CRC allows for receiver-side detection of errors in the decoded transport block. The corresponding error indication can, for example, be used by the downlink hybrid-ARQ protocol as a trigger for requesting retransmissions. If the transport block, including the transport-block CRC, exceeds the maximum code-block size (8448 for base graph 1 and 3840 for Base graph 2), code-block segmentation is applied before the LDPC coding as shown in FIG. 2. Code-block segmentation implies that the transport block is segmented into smaller code blocks, the sizes of which should match the set of code-block sizes supported by the LDPC coder.

In the case of a single code block when no segmentation is needed, no additional code-block CRC is applied, code-block segmentation is only applied to large transport blocks for which the relative extra overhead due to the additional transport block CRC is small. Information about the transport-block size is provided to the terminal as part of the scheduling assignment transmitted on the PDCCH control channel Based on this information, the terminal can determine the code-block size and number of code blocks. The terminal receiver can thus, based on the information provided in the scheduling assignment, straightforwardly undo or assemble the code-block segmentation and recover the decoded transport blocks.

Note that once the information bits are segmented and encoded using LDPC code (either base graph 1 or 2), they can be rate matched for the transmission. NR uses a circular buffer for rate matching each code block. Table 1 shows the starting position for different redundancy versions $k_0$:

TABLE 1

| | $k_0$ | |
|---|---|---|
| $rv_{id}$ | Base graph 1 | Base graph 2 |
| 0 | 0 | 0 |
| 1 | $\left\lfloor \frac{17N_{cb}}{66Z_c} \right\rfloor Z_c$ | $\left\lfloor \frac{13N_{cb}}{50Z_c} \right\rfloor Z_c$ |
| 2 | $\left\lfloor \frac{33N_{cb}}{66Z_c} \right\rfloor Z_c$ | $\left\lfloor \frac{25N_{cb}}{50Z_c} \right\rfloor Z_c$ |
| 3 | $\left\lfloor \frac{56N_{cb}}{66Z_c} \right\rfloor Z_c$ | $\left\lfloor \frac{43N_{cb}}{50Z_c} \right\rfloor Z_c$ |

In NR, for each transmission, the network can inform the UE which redundancy version it is currently scheduling. This is communicated via the downlink control channel for PDSCH transmission and downlink control channel (grant channel) for uplink data transmission.

It is also to be appreciated that not all versions of LDPC codes designed for 5G wireless communications are self-decodable. Self-decodability means that if say RV0 is set for one or all re-transmissions, then if the decoder is able to decode the transport block, then it is called self-decodable redundancy version. What we found from simulations is that Redundancy version 0 (RVO) is self-decodable for any code rate and modulation scheme. Redundancy version 1 (RV1) is self-decodable low code rates up to 0.35 and modulation schemes. Redundancy version 2 (RV2) is self-decodable low code rates up to 0.35 and modulation schemes. Redundancy version 4 (RV4) is self-decodable for any code rate and modulation scheme. Therefore, it can be appreciated that whenever a new data indicator is set to 1 indicating that there is new data in the transmission and not a retransmission, the Redundancy Version indicator is set to 1 or 2, and the modulation code scheme is set to an index number having a code rate above 0.3, then the codeword symbol would not be self-decodable, and would therefore not be used.

The standardized system does not have a place to explicitly indicate to the UE how many codewords are being used in a data traffic transmission, and a demodulation reference signal port indication, which can indicate a number of layers in a transmission has several ambiguous index values, where for index numbers 0-3, there can be either less than 4 layers, or more than 4 layers, and thus it is not clear whether the data traffic transmission comprises a single codeword symbol or two codeword symbols. The system disclosed herein takes advantage of that non-self-decodability of certain combinations of modulation schemes, RV indicators, and new data indicators, and whenever there is a data transmission with only one codeword symbol, the area of the downlink control structure that indicates the DCI for the second codeword symbol can be set to a combination of MCS index number, RV indicator, and new data indicator that is non-self-decodable, which can indicate to the receiver that there is only one codeword symbol in the transmission.

Turning now to FIG. 2, illustrated is an example block diagram showing a message sequence chart in accordance with various aspects and embodiments of the subject disclosure.

In an embodiment, a gNB device 202 can send one or more reference signals 206 to UE 204. In an embodiment, there sounding reference signal can be two types of uplink reference signals that are transmitted in different ways and used for different purposes by the gNB 202. 1) Sounding reference signals (SRS): These reference signals are specifically intended to be used by gNB 202 to acquire channel-state information (CSI) and beam specific information. In 5G systems, the SRS is UE specific so it can have a significantly lower time/frequency density. 2) Demodulation reference signals (DM-RS): These reference signals are specifically intended to be used by the gNB for channel estimation for data channel between the gNB 202 and the UE 204. The label "UE-specific" relates to the fact that each demodulation reference signal is intended for channel estimation by the network node 106 from a specific UE. That specific reference signal is then only transmitted within the resource blocks assigned for data traffic channel transmission to that terminal. Since in general the data is precoded, the DM-RDS can also be precoded with the same precoding as that of data.

At 208, the UE 204 can compute the CSI and determine parameters for the data transmission. The determination step consists for example computing channel quality indicator (CQI), precoding matrix index (PMI), and rank information (RI), CSI-RS Resource Indicator (CRI—e.g., beam indicator), etc. The CSI report can then be sent back to the gnB 202 on the feedback channel 210 where the gNB 202 can determine parameters for the downlink transmission including the modulation and coding scheme, power, physical resource blocks (PRBs), etc.

In an embodiment, the downlink control channel (PDCCH) carries information about the scheduling grants. Typically, this consist of number of MIMO layers scheduled, transport block sizes, modulation for each codeword, parameters related to HARQ, sub band locations etc. Note that, all DCI formats may not use transmit all the information as shown above. In general, the contents of PDCCH depends on transmission mode and DCI format.

For NR MIMO multi codeword transmissions, accurate indication of number of codewords is important as the number of layers transmitted in each slot can change. For example, the number of layers can be anywhere from 1 to 8. The UE can get this information from the number of DM-RS ports that are scheduled and signaled using DCI. As shown below in Table 1, the 5 bit DM-RS port indication (VALUE) can indicate to the UE the DMRS ports used for both one codeword and two codewords. This table is currently standardized in the standard. However, for value 0, there can be 1 DMRS port scheduled or 5 DMRS ports scheduled (0-4). Similarly, for value 1 there can be 1 DMRS port scheduled if one codeword, or 6 DMRS ports scheduled if there are two codewords. Similar issues exist for values 2 and 3. The UE therefore cannot determine whether there are 1 or 5 layers for value 0, 1 or 6 layers for value 1, 2 or 7 layers for value 2, or 1 or 8 layers for value 3. This might create a confusion for the UE when attempting to decode the PDSCH and eventually resulting in loss of the transmitted PDSCH. Hence throughput is reduced for 5G wireless systems.

provide modulation and coding scheme information, redundancy version information, and new data indicator information for both a first codeword symbol 304 and a second

TABLE 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

The system and method disclosed herein eliminate the ambiguity by indicating the number of codewords for multi-codeword MIMO in 5G systems, thereby eliminating the confusion for the UE to decode PDSCH. In summary we use the properties of LDPC codes to choose non self-decodable combination of modulation and coding scheme to indicate the number of codewords.

The system disclosed herein takes advantage of the non-self-decodability of certain combinations of modulation schemes, RV indicators, and new data indicators, and whenever there is a data transmission with only one codeword symbol, the area of the downlink control structure that indicates the DCI for the second codeword symbol can be set to a combination of MCS index number, RV indicator, and new data indicator that is non-self-decodable, which can indicate to the receiver that there is only one codeword symbol in the transmission.

Figure 3:
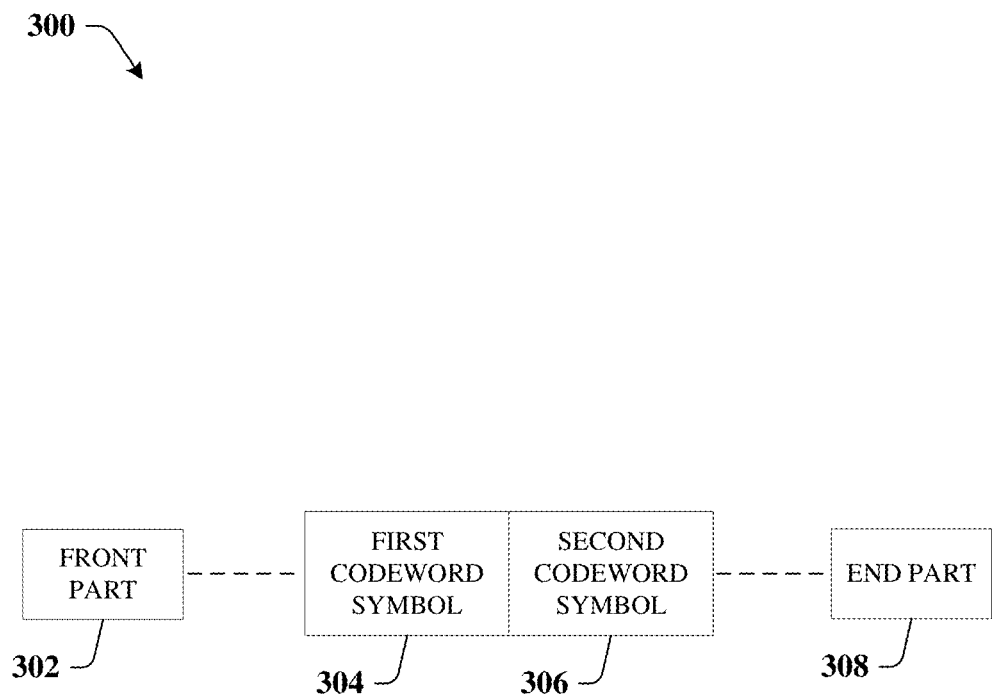
FIG. 3 illustrates an example block diagram showing a downlink control information structure for indicating downlink control information for two codeword symbols in accordance with various aspects and embodiments of the subject disclosure.
Figure 4:
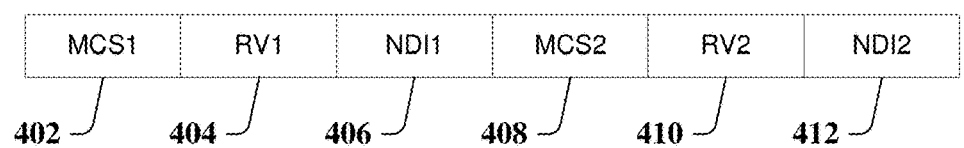
FIG. 4 illustrates an example block diagram showing a downlink control information structure in accordance with various aspects and embodiments of the subject disclosure.

Turning now to FIG. 3, illustrated is an example block diagram showing a downlink control information structure 300 for indicating downlink control information for two codeword symbols in accordance with various aspects and embodiments of the subject disclosure. The standardized downlink control information structure has a first location to codeword symbol 306. The DCI can include a front portion 302 that includes resource allocation in frequency and time domain and the end part such as HARQ process identifier etc. The end portion 308 can include HARQ process identifier, etc. In between it consists of MCS, RV and NDI for each codeword/Transport block. FIG. 4 shows more detail where the downlink control information structure 400 comprises a slot to indicate the MCS (402) Redundancy Version 404 and New data indicator 406 for the first codeword symbol as well as the MCS 408 RV 410, and NDI 412 for the second codeword symbol.

When the number of layers is greater than 4, the data transmission uses two codewords, hence any one of index numbers of MCS in tables 500 or 600 in FIG. 5 or 6 can be used to indicate the MCS of each codeword. Table 500 can be used when the maximum modulation of up to 64QAM (quadrature amplitude modulation) is used, or Table 6 can be used when the maximum modulation of 256QAM is used. The receiver and transmitter can determine which table is being used based on the channel state information indicating the quality of the communication link and signal to noise ratio and other contextual factors.

If only one codeword symbol is being used however, the transmitter can set the MCS1 402, RV1 404 and NDI1 406 settings based on the selected parameters for the codeword symbol, but then MCS2 408, RV2, 410 and NDI2 412 can be set to parameters that indicate a non-self-decodable codeword symbol which can indicate to the receiver that there is only one codeword symbol. For example, a modulation scheme can be selected that has a code rate above 0.3 or 0.35, and the redundancy version can be set to 1 or 2, and the new data indicator can be set to 1, indicating that this is a new data transmission and not a retransmission.

When the receiver receives the downlink control information, and determines that the second codeword symbol parameters are set to a non-self-decodable codeword symbol, the receiver can determine that there is only one codeword symbol, and decode the subsequent data transmission appropriately.

In an embodiment, the transmitter can also use the reserved index numbers (e.g., 29-31 in Table 500 or index numbers 28-31 in Table 600) in the MCS2 408 location to indicate that there is only a single codeword symbol.

Figure 7:
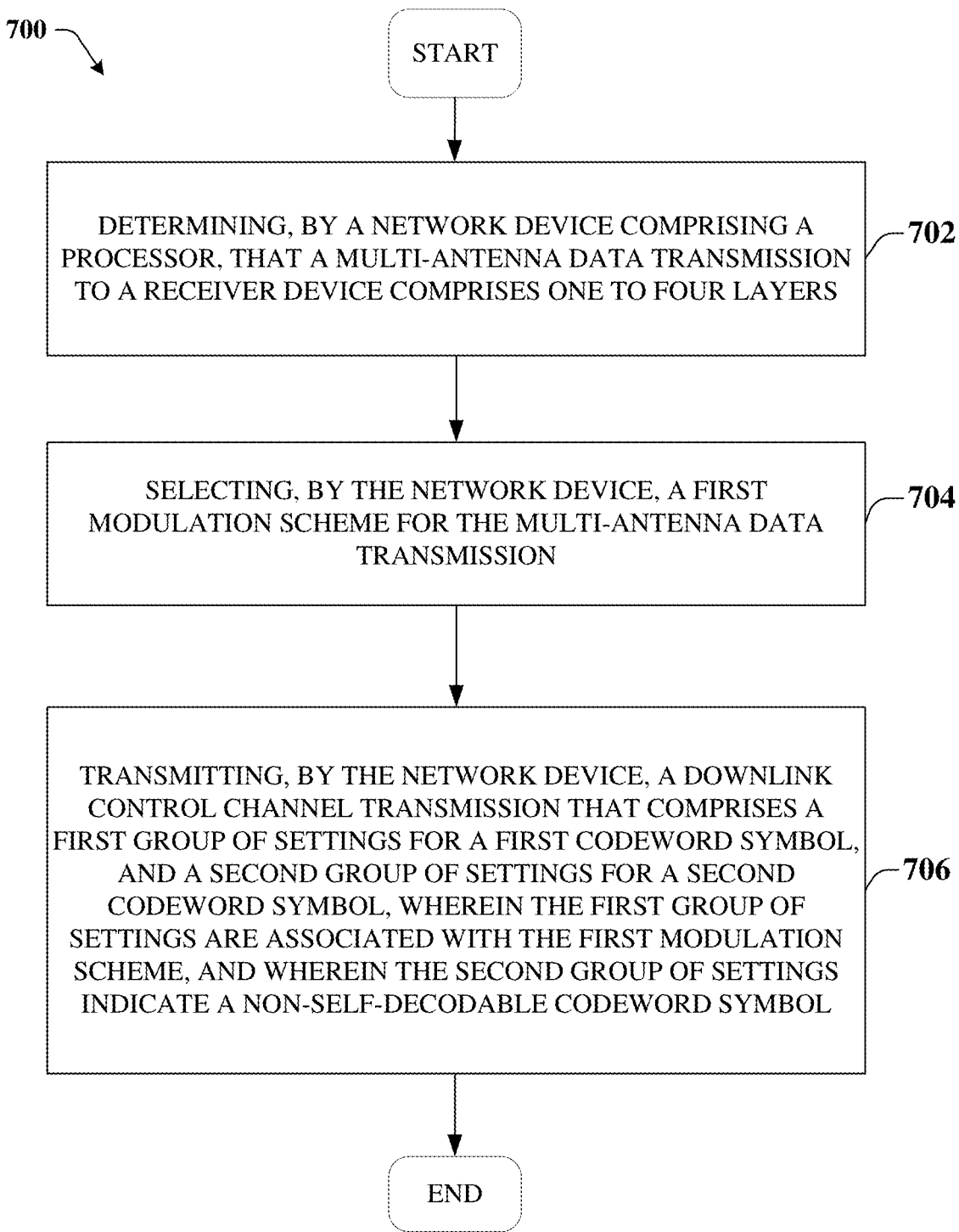
FIG. 7 illustrates an example method for indicating a number of codewords in a data traffic channel transmission in accordance with various aspects and embodiments of the subject disclosure.
Figure 8:
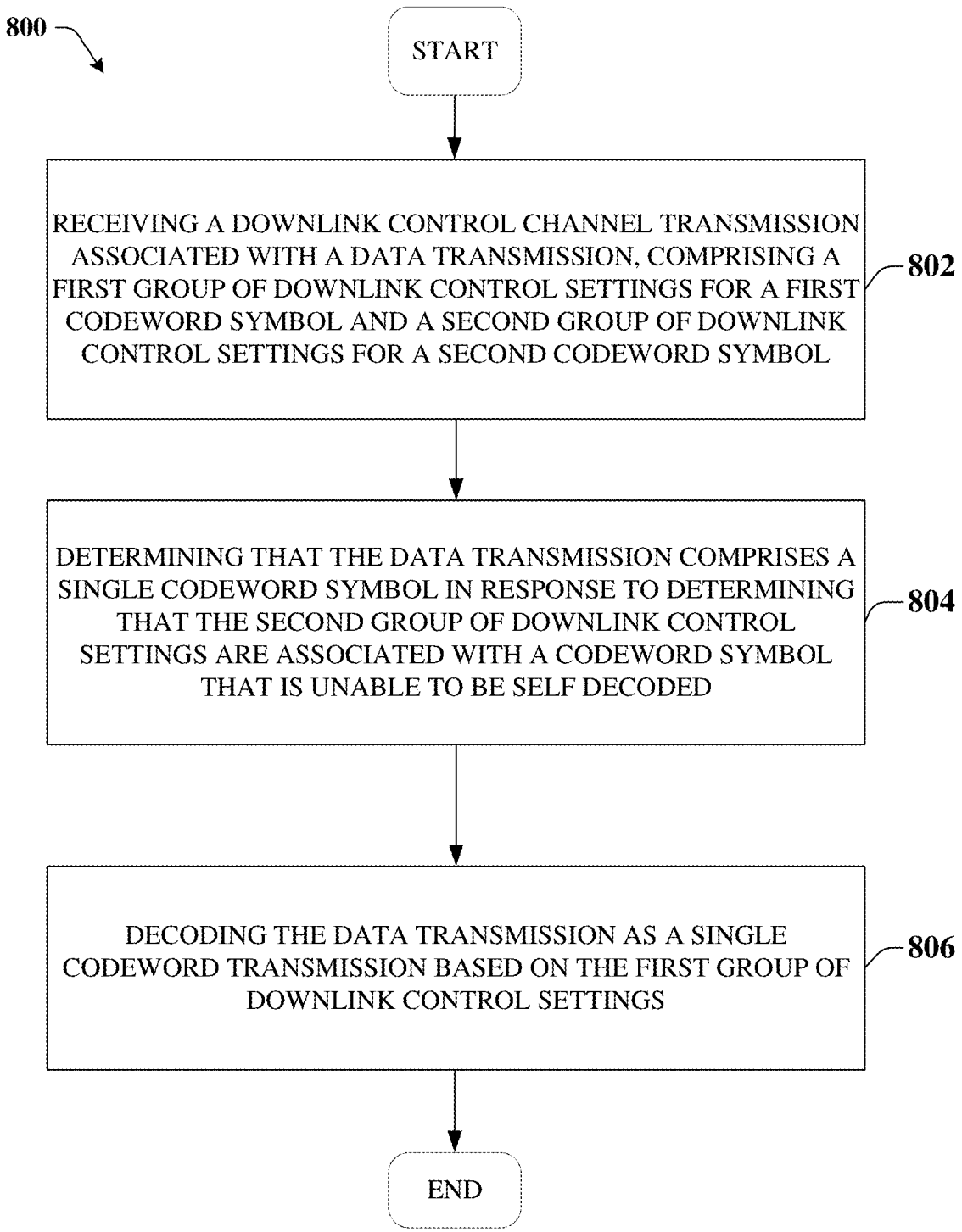
FIG. 8 illustrates an example method for determining a number of codewords in a data traffic channel transmission in accordance with various aspects and embodiments of the subject disclosure.

FIGS. 7-8 illustrates a process in connection with the aforementioned systems. The processes in FIGS. 7-8 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates an example flowchart indicating decision tree for selecting and conveying modulation scheme information in accordance with various aspects and embodiments of the subject disclosure.

At 602 the system can receive reference signals from a UE, and then based on the reference signals determine channel state information for the uplink channel. If a SNR 604 associated with the channel state information is above a threshold, then at 606, the system can select a transform precoding disabled modulation scheme, whereas at 608, if the SNR is below the threshold, the system can select a transform precoding enabled modulation scheme. At 610, the system can transmit the indication (e.g., 6 bit index number of the selection from e.g., MCS Table 4) to the UE device.

FIG. 7 illustrates an example method 700 for indicating a number of codewords in a data traffic channel transmission in accordance with various aspects and embodiments of the subject disclosure.

Method 700 can begin at 702 where the method includes determining, by a network device comprising a processor, that a multi-antenna data transmission to a receiver device comprises one to four layers.

At 704, the method includes selecting, by the network device, a first modulation scheme for the multi-antenna data transmission.

At 706, the method includes transmitting, by the network device, a downlink control channel transmission that comprises a first group of settings for a first codeword symbol, and a second group of settings for a second codeword symbol, wherein the first group of settings are associated with the first modulation scheme, and wherein the second group of settings indicate a non-self-decodable codeword symbol.

FIG. 8 illustrates an example method 800 for determining a number of codewords in a data traffic channel transmission in accordance with various aspects and embodiments of the subject disclosure.

Method 800 can begin at 802 wherein the method includes receiving a downlink control channel transmission associated with a data transmission, comprising a first group of downlink control settings for a first codeword symbol and a second group of downlink control settings for a second codeword symbol.

At 804, the method can include determining that the data transmission comprises a single codeword symbol in response to determining that the second group of downlink control settings are associated with a codeword symbol that is unable to be self decoded.

At 806, the method can include decoding the data transmission as a single codeword transmission based on the first group of downlink control settings.

Figure 9:
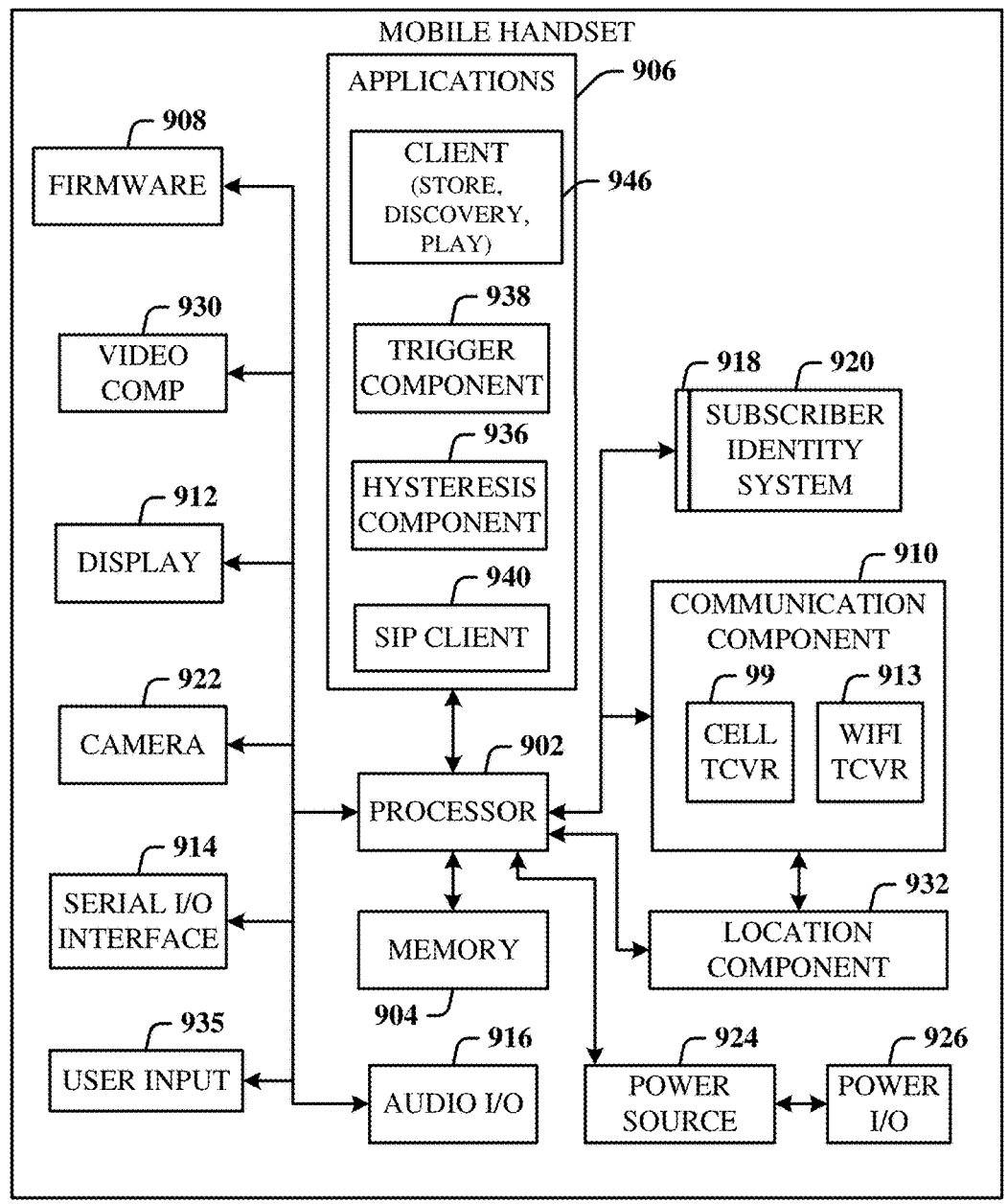
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
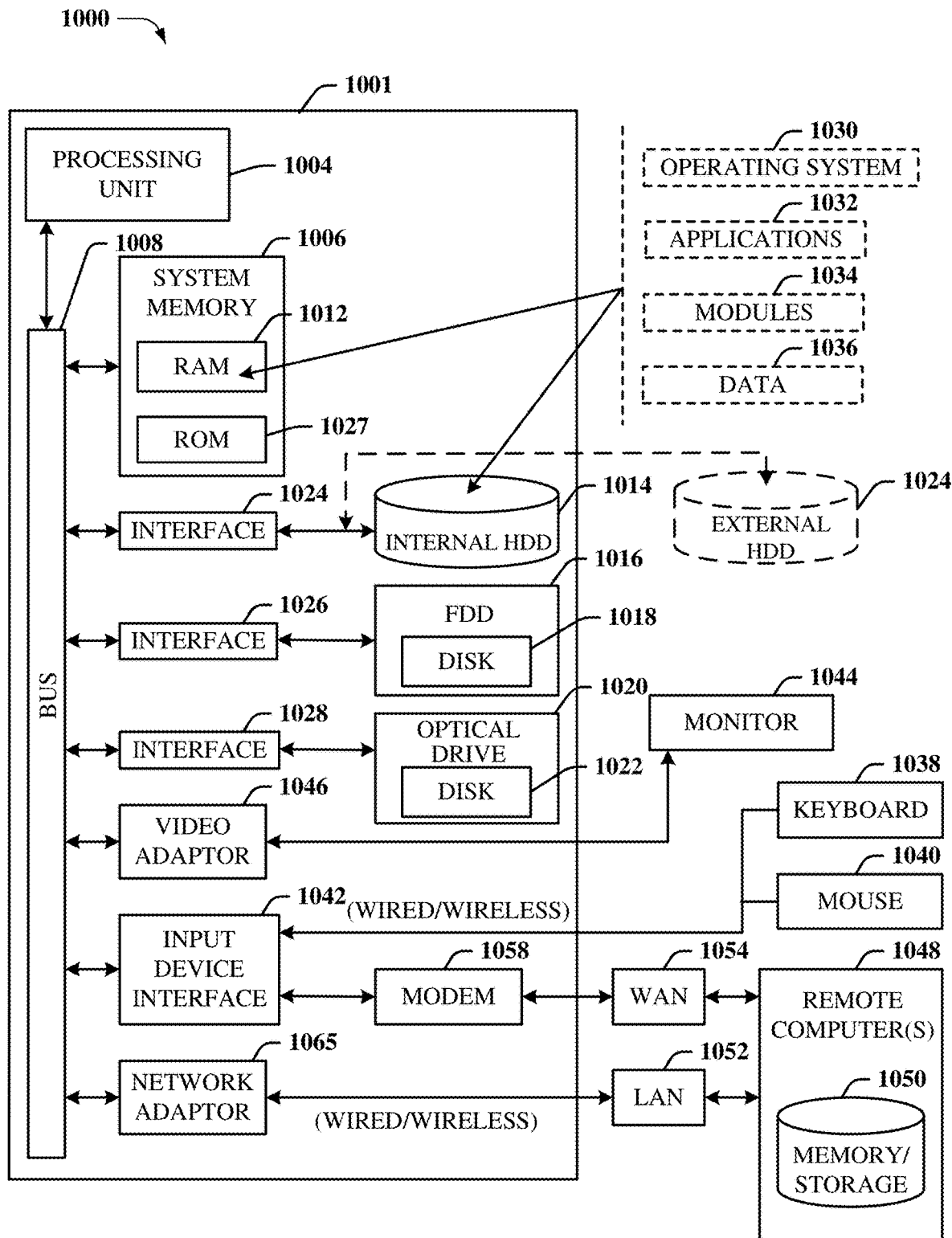
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106, gNB 202, e.g.,) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A transmitter device, comprising:
    a processor; and
    a memory that stores executable instructions that, when executed by the processor, facilitate performance of operations, comprising:
        determining that a data transmission to receiver equipment comprises a single codeword symbol;
        selecting a modulation scheme for the data transmission;
        facilitating a downlink control channel transmission of a control message via a downlink control channel, wherein a control message structure of the control message comprises a first area for communication of first information associated with a first codeword symbol, and a second area for communication of second information associated with a second codeword symbol and
        generating the control message comprising the second area, instead of comprising the second information associated with the second codeword symbol in accordance with the control message structure, comprises an indication that the first codeword symbol is not self-decodable.

2. The transmitter device of claim 1, wherein the second area further indicates to the receiver equipment that the data transmission comprises the single codeword symbol.

3. The transmitter device of claim 2, wherein the modulation scheme is a first modulation scheme, and wherein the operations further comprise, in response to the data transmission comprising two codeword symbols:
    selecting a second modulation scheme for the second codeword symbol; and
    performing the facilitating the downlink control channel transmission comprising the first selection of the modulation scheme, wherein the modulation scheme is associated with the first codeword symbol, and wherein the facilitating the downlink control channel transmission further comprises a third selection of the second modulation scheme associated with the second codeword symbol.

4. The transmitter device of claim 1, wherein the second area further comprises a redundancy version setting, a new data indicator setting, and a modulation scheme setting.

5. The transmitter device of claim 4, wherein a code rate associated with the modulation scheme setting is above a defined code rate.

6. The transmitter device of claim 4, wherein the redundancy version setting is set to a predefined starting position.

7. The transmitter device of claim 4, wherein the new data indicator setting is set to indicate that there is new data in the data transmission.

8. The transmitter device of claim 1, wherein the first group of settings comprise a modulation scheme setting, a redundancy version setting, and a new data indicator setting associated with the data transmission.

9. The transmitter device of claim 1, wherein the data transmission comprises between 1 and 4 layers.

10. The transmitter device of claim 1, wherein the selecting the modulation scheme for the data transmission further comprises:
    selecting a first index number from a first data structure in response to a data rate associated with the data transmission being determined to be below a defined threshold; and
    selecting a second index number from a second data structure in response to the data rate being determined to be above the defined threshold.

11. The transmitter device of claim 1, wherein the second area for communicating a second codeword symbol comprises a number of information bits designated to store bits of the second codeword signal therein.

12. A method, comprising:
    determining, by network equipment comprising a processor, that a multi-antenna data transmission to receiver equipment comprises one to four layers;
    selecting, by the network equipment, a first modulation scheme for the multi-antenna data transmission; and transmitting, by the network equipment, a downlink control channel transmission of a control message with a control message structure that comprises a first area for communicating first information associated with a first codeword symbol, and a second area for communicating second information associated with a second codeword symbol, resulting in a transmitted control message, wherein, instead of comprising the second information associated with the second codeword symbol in accordance with the control message structure, the second area of the transmitted control message comprises an indication that the first codeword symbol is a non-self-decodable codeword symbol.

13. The method of claim 12, further comprising selecting, by the network equipment, a second modulation scheme associated with a code rate above a defined code rate and a defined redundancy version setting, wherein the second area of the transmitted control message further comprises information corresponding to the second modulation scheme.

14. The method of claim 12, wherein the first area of the transmitted control message comprises information associated with the first codeword symbol.

15. The method of claim 14, wherein the first area of the transmitted control message further comprises information corresponding to the first modulation scheme setting, a first redundancy version setting, and a first new data indicator setting.

16. The method of claim 12, further comprising:
selecting, by the network equipment, a first index number for the first modulation scheme from a first data structure in response to a data rate associated with the multi-antenna data transmission below a defined threshold; and
selecting, by the network equipment, a second index number for the first modulation scheme from a second data structure in response to the data rate being above the defined threshold.

17. A receiver device, comprising:
a processor; and
a memory that stores executable instructions that, when executed by the processor, facilitate performance of operations, comprising:
receiving a downlink control channel transmission of a control message associated with a data message wherein a control message structure of the control message comprises first area for communicating first information associated with a first codeword symbol, and a second area for communicating second information associated with a second codeword symbol, and wherein, instead of comprising the second information associated with the second codeword symbol in accordance with the control message structure, the second area comprises an indication that the first codeword symbol is not self-decodable;
based on the indication, determining that the data transmission is based on the first codeword symbol that is not self-decodable; and
based on determining that the data transmission is based on the first codeword symbol that is not self-decodable, decoding the data transmission as a single codeword transmission based on the control message.

18. The receiver device of claim 17, wherein the second area further comprises a modulation scheme setting associated with a code rate above a defined code rate.

19. The receiver device of claim 17, wherein the second area further comprises a modulation scheme setting associated with a defined redundancy version setting.

20. The receiver device of claim 19, wherein decoding the data transmission as a single codeword transmission based on the control message comprises decoding the data transmission as a single codeword transmission based on the second area of the control message.

* * * * *